April 19, 1966  H. P. KALLMANN ETAL  3,247,427
CURRENT CONDUCTING DEVICE
Filed June 29, 1961  2 Sheets-Sheet 1
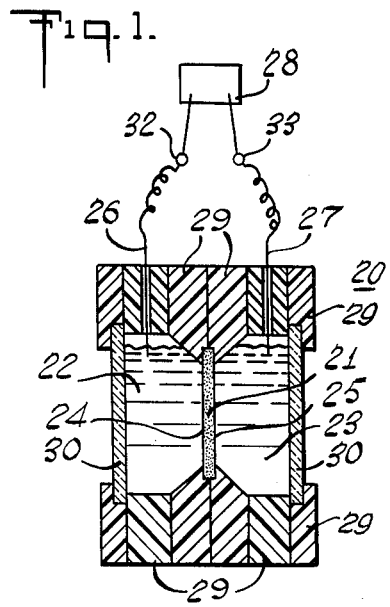
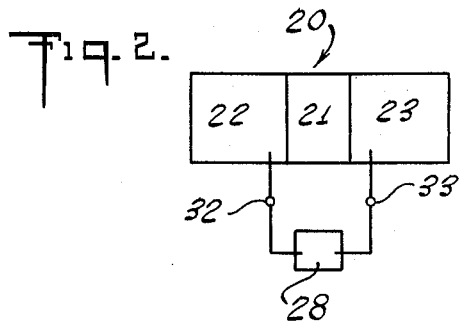
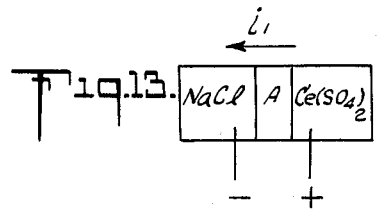
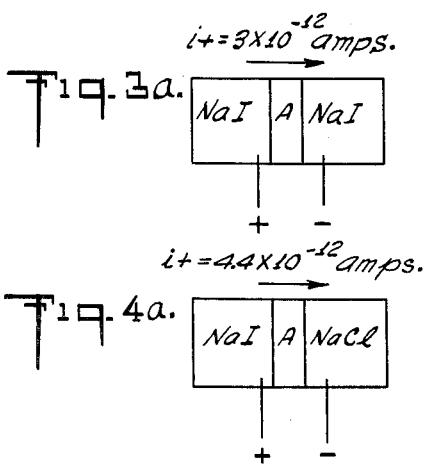
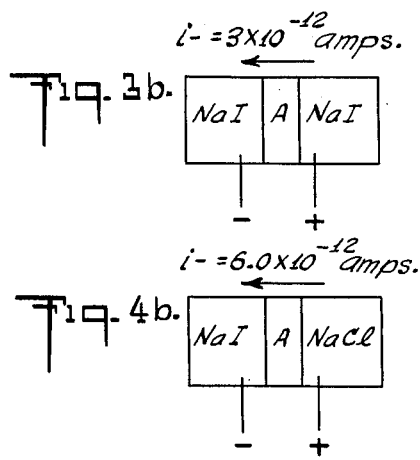
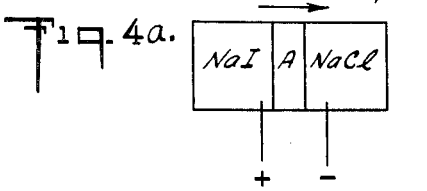
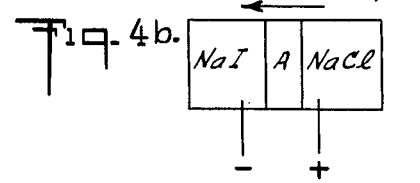
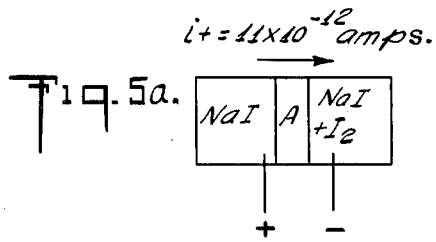
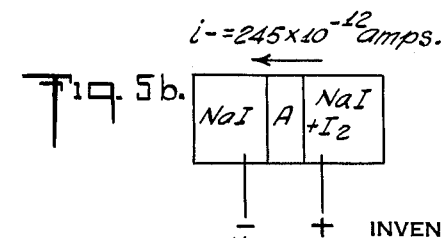
INVENTORS
HARTMUT P. KALLMANN
MARTIN POPE
BY
ATTORNEYS

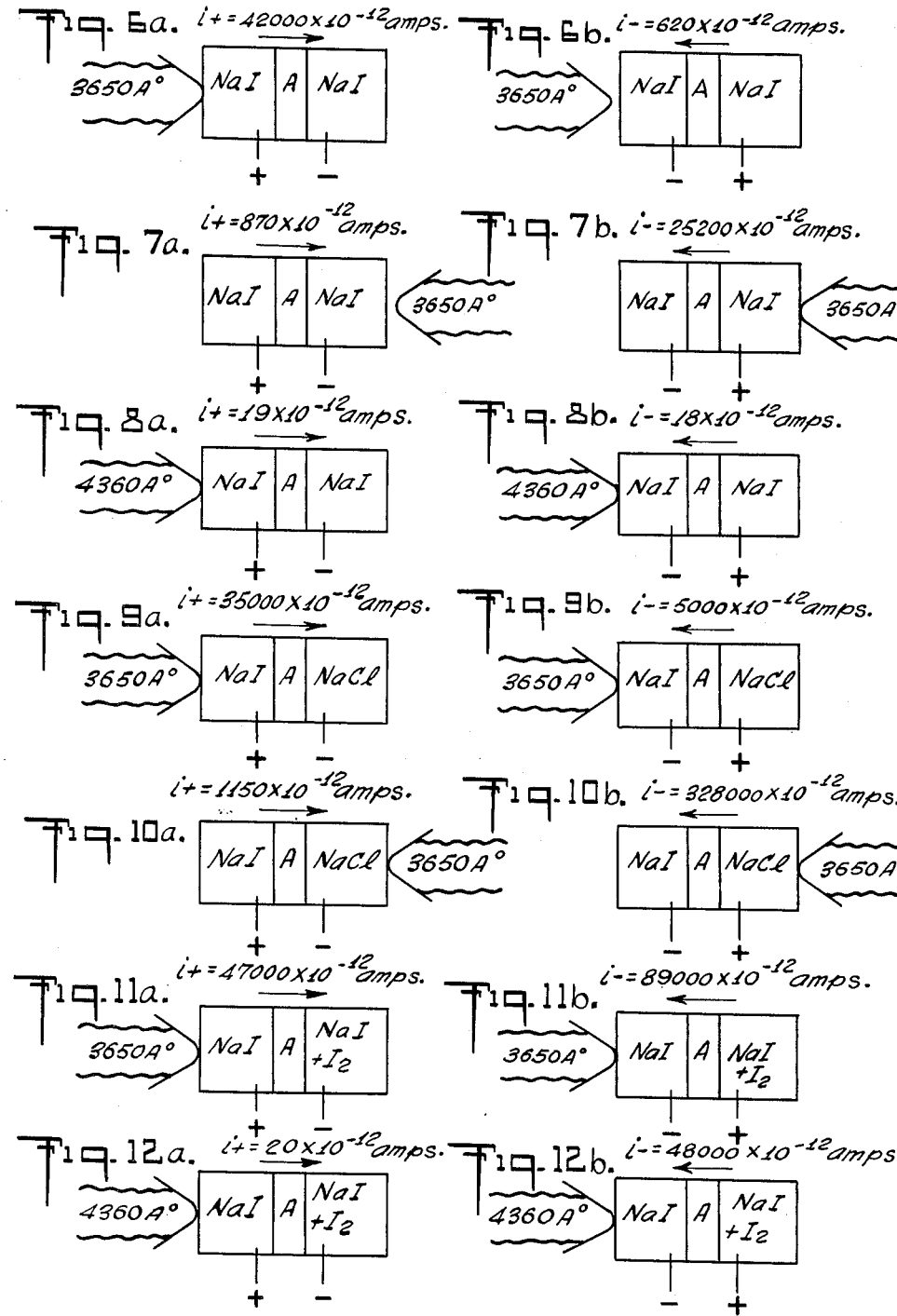

United States Patent Office 3,247,427
Patented Apr. 19, 1966

3,247,427
CURRENT CONDUCTING DEVICE
Hartmut P. Kallmann and Martin Pope, New York, N.Y., assignors to New York University, New York, N.Y., an educational corporation of New York
Filed June 29, 1961, Ser. No. 123,932
13 Claims. (Cl. 317—231)

This application is a continuation-in-part of copending application Serial No. 38,981, filed June 27, 1960, now abandoned.

This invention relates to a novel electrical current conducting device and also to methods for controlling bulk conductivity and direction of conduction in such device.

It is the principal object of the invention to provide a novel conducting device and methods for controlling the direction of current flow through such device and the bulk conductivity thereof wherein said device is made up of an organic material supported between a pair of electrodes, wherein at least one of said electrodes is electrolytic.

It is a further object to provide a novel current conducting device made up of organic material preferably in the form of a thin element having spaced first and second surfaces. Said material is supported between a pair of electrodes wherein at least one of said electrodes is an electrolyte. The electrolytic electrode is in contact with the first of said surfaces and is operated as an electron acceptor whereas the other electrode is in contact with the other of said surfaces and is operated as an electron donor, whereby the conductivity of such device is a function of the contents of the electrodes and furthermore, such conductivity and direction of current flow may be further regulated by the application of external energy to said device.

It is a further object of the invention to provide a novel current conducting device as described hereinbefore and a method of controlling same wherein direction of current flow through said device and the conductivity thereof depends upon current injection into the material from one of the electrodes and where conductivity is attributed to the energy balance at the spaced surfaces in direct contact with the respective electrodes.

It is a further object of the instant invention to provide a current conducting device exhibiting rectifier characteristics, the operation of which may be regulated by supplying electromagnetic wave energy of selected wave length to the device.

It is still another object of the invention to provide a novel current conducting device and method of operating same for producing voltages, the output of which may be regulated by supplying electromagnetic wave energy of selected wave length to the device.

Further objects and advantages will become apparent from the following description of the invention taken in conjunction with the figure, in which:

FIG. 1 is an elevation in section of a crystal cell in accordance with the invention;

FIG. 2 depicts a schematic diagram of the cell illustrated in FIG. 1;

FIGS. 3a to 12b and FIG. 13 depict schematically various combinations constituting cells operating in accordance with the invention for the purpose of showing some of its various characteristics.

Reference is now made to FIG. 1 which illustrates schematically a current conducting cell 20 in accordance with the principles of the invention. Cell 20 includes an organic material 21 supported between two electrolytic electrodes 22, 23. Material 21 has a pair of spaced surfaces 24, 25 wherein surface 24 is in direct contact with electrode 22 and surface 25 is in direct contact with electrode 23. In some of the illustrated embodiments, electrodes 22, 23 are a solution of sodium chloride (NaCl) or sodium iodide (NaI) dissolved in water. A pair of current conducting leads 26, 27 are supplied to connect electrodes 22, 23, respectively, to an external source of suitable D.C. voltage 28.

The illustrated assemblage constituting cell 20 is maintained leak proof and in assembled relationship by an outer shell 29 made up of non-conducting insulating material of suitable geometry and which shell includes windows 30 of quartz material along the outer sides of the respective electrode chambers. Quartz windows 30 are used because quartz will not block the passage of ultraviolet light into cell 20. In addition, these windows permit one to look into the cell to ascertain the level of the electrolyte in the electrode chambers.

Cell 20 is depicted schematically in FIG. 2 wherein its terminals 32, 33 connect the cell to source 28. Since the polarity of source 28 may be applied to cell 20 in two ways, it will be understood that current flows through cell 20 from left to right when terminal 32 is positive with respect to terminal 33 and this is indicated hereinafter by current "$i+$". On the other hand, current will flow through cell 20 from right to left when terminal 33 is positive with respect to terminal 32 and this is shown hereinafter by current "$i-$".

The following examples described hereinafter represent measurements of current flow through cell 20 for different combinations and arrangements of electrolytic material for electrodes 22, 23. The measurements were made on an embodiment of the device using a battery source 28 of fifty volts and employing an anthracene crystal 21 supported between electrodes 22, 23. In certain of the illustrated examples, electromagnetic wave energy, such as ultraviolet light, is injected into cell 20.

In the examples of FIGS. 3a, b, both cell electrodes 22, 23 are solutions of sodium iodide in water. For FIG. 3a, the polarity of battery 28 is arranged so that terminal 32 is positive with respect to terminal 33. The FIG. 3a current "$i+$" is in the order of 3 micromicroamperes Since the sodium iodide solution is a good conductor, the voltage drop across electrodes 22, 23 is negligible, whereby the voltage across anthracene crystal 21 is essentially fifty volts for FIGS. 3a, b. Accordingly, the resistance of crystal 21 without any light injected into cell 20 is in the order of $16.7 \times 10^{12}$ ohms. They polarity of battery 28 is reversed in FIG. 3b to provide a current flow "$i-$" through cell 20. However, current "$i-$" is substantially the same as "$i+$", i.e., $3 \times 10^{-12}$ amperes.

In the examples of FIGS. 4a, b, electrode 22 is a solution of sodium iodide in water, but electrode 23 is now a solution of sodium chloride in water. The current flow "$i+$" through cell 20 for FIG. 4a is in the order of $4.4 \times 10^{-12}$ amperes. For the same cell, but reversing the polarity of source 28, FIG. 4b, the current flow "$i-$" through the cell is $6.0 \times 10^{-12}$ amperes or double the current flow "$i-$" of FIG. 3b. Since both sodium iodide and sodium chloride solutions are good conductors, the voltage across the anthracene crystal 21 is essentially fifty volts. Yet upon comparing the currents "$i-$" of FIG. 4b with FIG. 3b, the value of the current for the former is twice as much as the latter. In addition, in comparing the currents "$i+$" of FIGS. 4a and 3a, the former is greater than the latter. This suggests that the contents of the electrode at the surface of contact with crystal 21, that is to say, the contents of the electrode from which the current flows upon entering the crystal, affects the conductivity of the crystal. Dependence of crystal conductivity on the contents of the electrode from which the current flows into the crystal is further demonstrated by the example of FIG. 5b.

In FIGS. 5a, b, electrode 22 is a sodium iodide solution, whereas electrode 23 is a saturated solution of iodine ($I_2$) in sodium iodide (NaI) dissolved in water. For the example of FIG. 5a, current "$i+$" is $11 \times 10^{-12}$ amperes; but in the example of FIG. 5b, current "$i-$" is $245 \times 10^{-12}$ amperes, an increase of eighty times more than the current "$i-$" for FIG. 3b.

In the foregoing pairs of examples for FIGS. 3a, b; 4a, b and 5a, b, the a and b variations for each pair of figures differ merely by reversal of battery polarity. For example, cell terminal 32 is positive for each of the a versions, and cell terminal 33 is positive for each of the b versions. This arrangement is followed for the other pairs of FIGS. 6a, b to 12a, b.

The current conducting cell 20 depicted in FIGS. 3a, b is also used in the examples depicted by FIGS. 6a, b; 7a, b and 8a, b. In FIGS. 6a, b, electromagnetic wave energy, in particular ultraviolet light having a wave length of 3,650 A. (1A.=$10^{-8}$ cm.), is supplied by an external source, not shown, and directed into cell 20 via quartz window 30 in a direction whereby the light passes through electrode 22 (which acts as a relatively transparent contact) to surface 24 where it is absorbed by the anthracene crystal 21. Light energy is released to crystal 21 at its surface 24 with the result that current "$i+$" for the FIG. 6a example is in the order of $42,000 \times 10^{-12}$ amperes, an increase of 14,000 times greater than the dark current "$i+$" for FIG. 3a. Some of the light energy moves through crystal 21 and reaches its other surface 25. This explains the current "$i-$" of $620 \times 10^{-12}$ amperes for the example of FIG. 6b, which is an increase of 200 times the dark current "$i-$" of FIG. 3b. Part of the ultraviolet light absorbed by the anthracene crystal 21 is converted into fluorescent light, whereby the crystal emits fluorescent light.

The examples of FIGS. 7a, b are identical to the examples of FIGS. 6a, b, except that the ultraviolet light is now injected into cell 20 along a direction whereby the light passes through electrode 23 (which acts as the transparent contact) to surface 25 for absorption by the crystal. The results for these examples follow the same pattern indicated by FIGS. 6a, b, i.e., "$i+$"=$870 \times 10^{-12}$ amperes and "$i-$"=$25,200 \times 10^{-12}$ amperes. The difference in magnitude for the currents between the examples of FIGS. 6a, b and FIGS. 7a, b suggest some crystal asymmetry in absorbing the ultraviolet light.

In the examples of FIGS. 8a, b, the cell 20 is illuminated with ultraviolet light but now having a wave length of 4,360 A. The direction of light illumination is through the light transparent electrode 22 to surface 24. Anthracene crystal 21 is relatively transparent to ultraviolet light of 4,360 A. wave length, consequently, very little light energy is absorbed by crystal 21. As a result, the currents "$i+$" and "$i-$" do not increase as significantly as the examples of FIGS. 6 and 7; "$i+$" and "$i-$" for FIGS. 8a, b are $19 \times 10^{-12}$ amperes and $18 \times 10^{-12}$ amperes, respectively, an increase in the order of six times more than the dark currents of FIGS. 3a, b.

The cell depicted in the examples of FIGS. 4a, b is again employed for the examples shown in FIGS. 9a, b and 10a, b. In the examples of FIGS. 9, b, ultraviolet light having a wave length of 3,650 A. is directed into crystal 21 by passing the light through electrode 22 to surface 24, that is, the light is directed into the crystal through the electrode chamber containing the sodium iodide solution. For the example of FIG. 9a, the current "$i+$" is in the order of $35,000 \times 10^{-12}$ amperes. In the example of FIG. 9b, the current "$i-$" is $5,000 \times 10^{-12}$ amperes.

In the examples of FIGS. 10a and 10b, the ultraviolet light 3,650 A., is directed into the side of cell 20 containing the sodium chloride solution electrode which is also transparent to the light. The value of current "$i+$" for FIG. 10a is in the order of $1,150 \times 10^{-12}$ amperes, whereas the current "$i-$", example FIG. 10b, is in the order of $328,000 \times 10^{-12}$ amperes. The current values for the examples of FIGS. 10a, b in comparison to the examples of FIGS. 9a, b indicates that the sodium chloride solution electrode together with ultraviolet light causes anthracene crystal 21 to conduct almost ten times better than the sodium iodide solution electrode in combination with ultraviolet light. In the examples of FIGS. 9a, b, the ratio of the currents "$i+$" and "$i-$" is in the order of 7 to 1; in the examples of FIGS. 10a, b, the ratio of the currents "$i-$" to "$i+$" is almost 300 to 1. If a cell 20 as depicted in FIG. 9 and 10 is to be used as a diode, the arrangement of FIG. 10b is the desired one of the two.

The cell depicted in FIGS. 5a, b is used for the examples of FIGS. 11a, b and 12a, b. With respect to the examples of FIGS. 11a, b, ultraviolet light having a wave length of 3,650 A. is directed into the side of cell 20 containing electrode 22. The current "$i+$" is $47,000 \times 10^{-12}$ amperes, and the current "$i-$" is $89,000 \times 10^{-12}$ amperes. These currents are relatively high in comparison to the correlated dark currents for the examples of FIGS. 5a, b. The current "$i+$" is high because the ultraviolet light releases energy to the surface 24 into which current is entering crystal 21 from the electron acceptor electrode. The current "$i-$" is high because the surface 25, in direct contact with electrode 23, receives some light energy. The ultraviolet light is not completely absorbed by the crystal, hence some light energy passes through the crystal and is released at surface 25. In addition, electrode 23 contains the iodine solution which, as shown in the example of FIG. 5b, increases the conductivity of the anthracene crystal especially when the iodine solution absorbs the light released at surface 25.

With respect to the example of FIGS. 12a, b, ultraviolet light having a wave length of 4,360 A. is directed into the side of cell 20 containing electrode 22. As noted hereinbefore, light of such wave length is not absorbed by the anthracene crystal 21, consequently, the value of current "$i+$," $20 \times 10^{-12}$ amperes, is practically the same as the example of FIG. 8a. However, when the 4,360 A. light leaves the anthracene crystal surface 25 after passing through the crystal, the light is absorbed by the iodine content in electrode 23 which is in direct contact with surface 25. The presence of iodine in combination with the release of light energy in electrode 23 results in the high current flow "$i-$" of $48,000 \times 10^{-12}$ amperes. With respect to the foregoing examples, the examples of FIG. 12 provide the maximum current ratio between currents "$i+$", "$i-$", a ratio of 1:2,400.

It is believed that a brief explanation of the methods of current conduction in an organic crystal would be helpful before attempting to explain the significance of the examples of FIGS. 3 to 12. There are various types of current conduction in organic crystals. One involves the injection of an electron into the crystal. When an electron is injected into a potentially neutral lattice structure of crystal molecules, one molecule is charged negative and the potential of that molecule becomes lower with respect to surrounding molecules. The electron moves from a lower potential level to a high potential level, therefore, an excess electron from the lower potential molecule will move to a neighboring molecule. The molecule now containing the excess electron is charged negative, whereby the excess electron drifts to another molecule and so on. When a voltage source is applied across the crystal, the general direction of excess electron drift is toward the positive terminal of the applied voltage source. Accordingly, if electrons are continuously injected into the crystal from a negative electrode, an electron donor, there will be a flow of current in the crystal toward the positive electrode. This type of current flow is called negative carrier current.

A second method of current conduction involves the removal of an electron from the crystal lattice, and it is known in the art as injection of a positive hole into the crystal. When a crystal molecule loses an electron, it is charged positive with respect to neighboring molecules and thus will extract an electron from a neighboring molecule. The molecule which is now electron deficient will extract an electron from another molecule, and so on. The locations of the positively charged molecules, the positive hole, drift around in the crystal. However, when a voltage is applied across the crystal, the positive holes will move toward the negative terminal of the applied voltage source. Consequently, if positive holes are injected continuously into the crystal lattice from a positive electrode, an electron acceptor, there will be a flow of positive hole current in the crystal towards the negative terminal of the applied voltage. Sometimes this type of current is called a positive carrier current.

Depending upon the structure of the particular crystal, some crystals will show a preference for supporting only negative carrier current flow during current conduction; other crystals will show a preference for supporting only positive carrier current flow during current conduction; and still other crystals will support both kinds of carrier currents simultaneously. With respect to anthracene, bulk current flow during photo conduction is effected mostly by a positive carrier current.

Since positive hole current represents the bulk current conduction in the anthracene crystal 21, the description of hole injection into the crystal surface in contact with the positive electrode explains the phenomena for the illustrated examples of FIGS. 3 through 12. The anthracene crystal 21 is normally electrically neutral. Accordingly, the crystal requires energy to inject hole current therein, that is to say, to remove an electron from crystal 21, whereby the crystal gains potential energy. On the other hand, when an electron is added to the positively charged crystal at its other surface, that is to say, the surface in contact with the negative electrode, an equal amount of energy is released by the crystal to the negative electrode. As known in the art, the magnitude of this energy is in the order of 5.5 ev. (electron-volt). In other words, it requires about 5.5 ev. energy to free an electron from the crystal surface in contact with the positive electrode. This amount of energy may be applied to the crystal molecule by any one or combination of the following: heat, i.e., by supplying thermal energy to the crystal; by supplying electromagnetic wave energy, such as ultraviolet light of suitable frequency to the crystal; or by energy released to the crystal by the electrode in contact with the crystal surface.

It will be understood that the electrode taken as a whole is also electrically neutral, and thus requires energy to remove an electron therefrom. The same amount of energy is released by the electrode when an electron, released by the anthracene crystal, is added to the electrode. This energy exchange creates a condition favorable for positive hole injection into crystal 21, which, as seen from the foregoing examples, is a function of the type of electrode, that is to say, the contents of the electrode making direct contact with the crystal surface into which positive hole injection occurs. The energy balance for the process of hole injection into the crystal surface may be described as follows:

$$We + Ex \geq Ia \qquad [1]$$

where the symbol $Ia$ represents the energy required to remove an electron from the solid anthracene crystal 21 thereby resulting in the injection of a positive hole in the solid crystal and which at the same time releases an electron $e^-$ to the electrode, which electrode is in direct contact with the crystal surface into which positive hole injection occurs. The symbol $We$ is the energy required to remove an electron from the electrode or conversely, the energy released by the electrode when an electron is added thereto; and the symbol $Ex$ is the energy (electromagnetic wave or thermal) externally applied to the crystal at the surface into which positive hole current occurs.

As known in the art, the energy $Ex$ given to the anthracene crystal by 3,650 A. light is 3.3 ev. Hence, the addition of such external energy $Ex$ to the crystal in accordance with Equation [1], whereby the sum of $We + Ex$ is greater than $Ia$, results in a large injection of positive holes into the crystal thereby increasing crystal conductivity. This explains the reason that current "$i+$" in the example of FIG. 6a is much larger than current "$i+$" for FIG. 3a. Since the crystal is relatively transparent to 4.360 A. light, the external energy $Ex$ added to the crystal is negligible. Hence, "$i+$" in FIG. 8a is not much greater than "$i+$" for FIG. 3a. It will be noted that the examples of FIGS. 9a, 10b, 11a and 12b follow the same pattern.

Upon the release of an electron to the electron acceptor electrode, the positive hole carrier in the crystal travels through the crystal under the influence of the electric field in the crystal to the other surface, i.e. the side in direct contact with the negative electrode, that is to say, the electron donor electrode. A positive hole is discharged into the negative electrode at the latter crystal surface or in other words, the crystal receives an electron from the electrode into which the positive hole current flows from the crystal. In order to receive an electron from a negative electrode, the following energy balance equation must be satisfied at the latter crystal surface:

$$Ia + Ex > We \qquad [2]$$

Equation 2 holds that the sum of external energy, $Ex$, supplied to the crystal at its surface and the energy released by the crystal $Ia$ by reason of the injection of an electron therein must be greater than the energy required to remove such electron from the negative electrode. As will be shown later, $We = 4.2$ ev. upon removal of an electron from the electrode containing $OH^-$. Since $Ia = 5.5$ ev. the discharge of a hole into the negative electrode will always occur as long as the electrode is suitably ionized.

The foregoing experiments demonstrate that electron or hole injection occurs at the surface of the crystal in direct contact with the electrode. Hence, the equations for expressing the phenomena include the energy relationships of the electrode and crystal at their respective contacting surfaces. The energy directed into cell 20 is to a greater or lesser extent absorbed by the molecules of the electron acceptor electrode in contact with the crystal surface. Hence, the thickness of this electrode among its other characteristics should be selected whereby the directed energy penetrates sufficiently therein to excite the surface of the crystal; preferably the electrode and energy should be mutually characterized so that the directed energy penetrates to the crystal surface in contact with boundary electrode molecules to ensure maximum excitation of such molecules.

Referring to Equation [1], it was stated that $Ia = 5.5$ ev. There will always be some small amount of external energy $Ex$ due to ambient thermal energy, however, the value of $Ex$ for the purpose of Equations [1] and [2] will depend whether or not the electromagnetic wave energy penetrates to the crystal and if so, whether it is absorbed. For 3,650 A. ultraviolet light, it was stated that the supplied energy $Ex = 3.3$ ev. Furthermore, $Ex + We$ must be greater than 5.5 ev. in order to inject a positive hole in the anthracene crystal 21. In all the illustrated examples except for the "$i-$" currents of FIGS. 5b, 11b and 12b, the positive electrode consists of one molar solution of sodium iodide or sodium chloride in water. These salt solutions contain two positive ions, namely, the hydronium ion $(H_3O)^+$ and the sodium ion $(Na)^+$. The negative ions in these salt solutions, namely, the hydroxide ion $OH^-$, the chloride ion $Cl^-$ or the iodide ion $I^-$, do not play any role in the release of an electron from anthracene crystal 21. Only the positive ions are capable of receiving an electron and, in addition, the electron will be attracted to the positive ion which causes the release of the most energy upon receiving an electron. For the foregoing salt solutions, the hydronium ion $H_3O^+$ attracts the electron from the anthracene crystal and the process equation for this chemical reaction is as follows:

$$H_3O^+(aq)+e^-(g) \to H_2O+\tfrac{1}{2}H_2(g)+We \quad [3]$$

where $We$ for this reaction is 4.7 ev.

With Equation [1] written as $Ex>Ia-We$ and upon substituting the values of $Ia=5.5$ ev. and $We=4.7$ ev., it is seen that in order to inject a positive hole into the crystal, $Ex$ should be greater than 0.8 ev. In other words, for $Ex>0.8$ ev. applied to the crystal molecule, the crystal is capable of releasing one electron to the positive electrode. This requirement is abundantly satisfied in the examples of FIGS. 6a, 7b, 9a, 10b and 11a. The very small currents for certain of the illustrated examples such as FIGS. 3a, b; 4a, b; and 5a are attributed to the presence of some small amount of thermal energy supplied to crystal by reason of ambient temperatures.

For the "$i-$" currents in the examples of FIGS. 5, 11b and 12b, the positive electrode 23 in each case includes uncharged iodine atoms and molecules as well as hydronium ions $H_3O^+$ and sodium ions $Na^+$. The negative ions are not important for the generation of these currents. In these examples, an electron is removed from the crystal surface by an iodine atom (or $I_3^-$ ion) because the energy released by this process is greater than that which would be produced by the discharge of a positive ion. The energy $We$ released by this reaction is about 6.2 ev. and is calculated as follows:

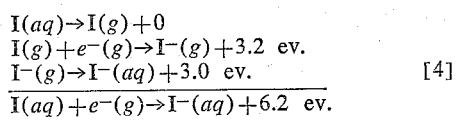

Since $We$ is greater than $Ia$, for the examples of FIGS. 5b, 11b and 12b, positive hole injection will occur even if external energy $Ex$ is not supplied. This explains the increased current for the FIG. 5b example where $Ex$ is substantially zero. The larger "$i-$" current for FIG. 11b example is explained by the fact that some of the ultraviolet light energy is transmitted to electrode 23 through crystal 21 in the form of fluorescent light. The relatively very high "$i-$" current in FIG. 12b is attributed to the fact that the major part of the 4,360 A. ultraviolet light energy is absorbed by the iodine molecules $I_2$ in electrode 23 whereby these molecules disassociate into the iodine atom I in greater quantity than in room temperatures. From Equation [4], it is seen that an increase of iodine atoms in the positive electrode draws more electrons from the anthracene crystal, thereby measurably increasing current flow through cell 20.

Upon comparing the examples of FIGS. 9a and 10b, it is seen that the sodium chloride solution electrode is more efficient than the sodium iodide solution. In other words, the sodium chloride electrode produces more current than the sodium iodide electrode although the chloride ion $Cl^-$ and the iodide ion $I^-$ are not directly involved in the hole injection process. This is attributed to the fact that the physically larger iodide ion can absorb more energy from the optically excited anthracene, making this energy unavailable for the ionization of the anthracene molecule and causing a quenching of the excitation energy of the anthracene by the $I^-$ ion.

Reference is now made to Equation [2] which sets forth the energy relationship for releasing an electron to the crystal surface by the electron donor electrode in contact therewith. The ions in the negative electrode capable of releasing electrons to the crystal are the hydroxide ion $OH^-$ and the iodide ion $I^-$ or chloride ion $Cl^-$. The released electron is attributed to the hydroxide ion $OH^-$, and injection of an electron occurs when $Ia+Ex$ is greater than $We$. The process of electron removal from the hydroxide ion is as follows:

$$OH^-(aq)-e^-(g) \to \tfrac{1}{2}H_2O+\tfrac{1}{4}O_2-We \quad (5)$$

where $We=4.2$ ev. As stated hereinbefore, $Ia$ has a value of 5.5 ev. and since $We$ is less than 5.5 ev., Equation [2] is always satisfied to effect the injection of an electron into the crystal or positive current flows into the negative electrode so long as there is an hydroxide ion present.

Reference is now made to the examples of FIGS. 3b and 5b wherein it is noted that the current "$i-$" for the latter is in the order of 80 times greater than the "$i-$" current of the former. This is attributed to the presence of the iodine atom I dissociated from the iodine molecule $I_2$ in the FIG. 5b solution at the crystal surface. As noted from Equation [4], the released $We$ is 6.2 ev. for the reaction of this type of electrode at the crystal surface which is greater than the requirements of 5.5 ev. for $Ia$. The foregoing example indicates that the current flow through the anthracene crystal may be measurably increased in one direction by the use of a suitable electron acceptor which is characterized to release more than 5.5 ev. upon receiving an electron. For example, in another test a cell as depicted in FIG. 13 was operated with a sodium chloride (NaCl) negative electrode, an anthracene crystal, and, as the positive electrode, ceric sulfate $Ce(SO_4)_2$ dissolved in water. The cell provided a dark current (without any light injected into the cell) of 500,000 times greater than the value of the dark current for a cell employing a sodium chloride salt solution (NaCl) as the positive electrode. The ceric ion $Ce^{++++}$ yields a $Ce^{+++}$ ion and a very large amount of energy $We$ upon receiving an electron. Upon reversing the polarity of the external source 28 to the FIG. 13 cell, the "$i+$" current was measured and compared to the "$i-$" of FIG. 13; the current ratio of "$i+$ to $i-$" for the ceric cell measured 1 to $10^5$.

From the foregoing, it is seen that a current flow through cell 20 may be controlled upon the application of suitable electromagnetic wave energy to the cell, particularly, when the cell employs a strong electron acceptor electrode. By comparing the results of FIGS. 5b, 11b and 12b, it will also be understood that it is possible to control the electron acceptor characteristics of the electrode and thus the amount of current injection into the cell crystal by regulating the electromagnetic wave energy "on-off" and its wave length. A cell in accordance with the invention may be used for the production of chemical voltages. For example, hole injection into crystal 21 may be effected with such strong external energy that cell 20 will provide a current flow through an external conducting body connected to its terminals 32, 33 even though voltage source 28 is not connected to the cell. In one such test, cell 20 produced a terminal photo voltage of 0.5 volts and a $20 \times 10^{-12}$ ampere current flow was observed without any external voltage source 28 applied to the cell. In this test, the cell was made up of an anthracene crystal supported between an NaCl solution electrode and an $NaI+I_2$ solution electrode with 3,650 A. light directed into the NaCl electrode.

A cell as described herein may be used as a rectifier and, in particular, a rectifier whose characteristics may be controlled by electromagnetic energy such as light. According to the direction of light entry into the cell, the cathode and collector of the rectifier may be reversed at will; and by cutting off the supply of light, conduction of the rectifier in either direction may be cut off. In addition, a cell in accordance with the principles of the invention may be operated as a good conductor in both directions by shining light into the cell in both directions. Furthermore, the current flow in the cell may be regulated by modulating the light directed into the cell. From the examples shown herein, cell 20 can be operated to exhibit fixed rectifier characteristics even without any light directed into the cell upon the use of a suitable electron acceptor electrode in one side of the cell. Although liquid electrodes were contemplated in the examples described herein, viscous, molten salt or solid material electrodes may be employed as long as good direct contacts are achieved with the crystal surfaces, and wherein the positive electrode exhibits good electron acceptor characteristics to effect desired positive hole injection into the crystal.

In its preferred form, the thickness of crystal 21 between its contacting surfaces 24, 25 should be as small as practicable to minimize resistivity of the crystal to current flow therethrough since resistivity is a function of such thickness. In the examples referred to hereinbefore, the anthracene crystal used had a thickness of $10^{-3}$ cm. between its surfaces 24, 25. By virtue of the cell assembly illustrated in FIG. 1, electrodes 22, 23 are electrically isolated except for conduction through crystal 21; the crystal is impervious to aqueous solutions. Although the electrodes illustrated herein are both electrolytes, the principles of the invention are still accomplished if the negative electrode, the electron donor, were made of metal, such as silver. However, it will be understood that better results are achieved when both electrodes are electrolytes.

Furthermore, it will be understood that the selection of the organic material for use in a current conducting device in accordance with the invention is not limited to the anthracene crystal. Any one of a great variety of organic compounds may be selected and used successfully, such as naphthalene, phenanthrene, pyrene, perylene, pyranthrene, violanthrene, coronene, and in fact all polycyclic aromatic hydrocarbons which form molecular complexes with bromine or iodine. Further examples of alternative organic material, are those multi-ring compounds that are referred to as benzenoid hydrocarbons, which include diphenyl, terphenyl, quaterphenyl, and all other compounds which maintain an unbroken chain of conjugated double bonds across the length of the hydrocarbon, or those compounds containing conjugated double bonds arranged linearly, known as linear polyenes, also the carotenoids, including carotene and lycopene.

Furthermore, the particular electrolyte employed to effect hole injection need not be confined to the salt solutions illustrated herein. For example, it has been indicated that $Ce^{++++}$ is excellent for this purpose and in fact, any water soluble compound or ion capable of acting as an oxidizing agent would be satisfactory. However, it should be understood that the selection of a particular organic material and the operatively associated electrolytic material to be used therewith for making up a cell 20 should be of such characteristics to satisfy Equations [1] and [2]. In other words, when the selected combination of electrodes and organic material constituting cell 20 satisfies the energy of Equations [1] and [2], hole injection and current conduction will follow. Naturally, and as indicated by the illustrated examples, certain combinations will provide better results than others. The idea to be derived from the illustrated examples is that for any organic material, once a hole is injected into the material, it will be free to travel under the action of the applied electric field. However, there will be a difference in the mobility of the holes through the material and this mobility will depend upon the nature of the material. Nevertheless, if the energy requirements as stated in Equations [1] and [2] are satisfied, hole injection and thus conductivity will be greatly enhanced.

A water soluble compound containing undissociated molecues capable of acting as an oxidizing agent may be used to particular advantage in the present invention. As a specific illustration thereof an acidic solution containing picric acid in water is particularly favored as such an electrolytic electrode. The effectiveness of picric acid as an electrolytic electrode depends upon the concentration of undissociated picric acid molecules in solution, increasing with increasing concentration of these molecules. The concentration of undissociated picric acid molecules may be varied merely by changing the hydrogen ion concentration of the solution. In a typical test at a concentration of undissociated picric acid of 0.013 mole per liter and a hydrogen ion concentration of 0.16 mole per liter, the value of the dark current is $65 \times 10^{-13}$ amp./cm.$^2$ and the photocurrent is $28,000 \times 10^{-13}$ amp./cm.$^2$. Upon reducing the hydrogen ion concentration by a factor of five, thereby doubling the undissociated picric acid concentration, the dark current is observed to also double in magnitude. In this test the current observed is negative when the picric acid electrode is at a positive potential. The other electrode is a sodium chloride electrode which exhibits a negligible $i-$ current under the same test conditions.

For convenience, as used in the appended claims, the term "electron donating" will encompass the term "hole accepting," and the term "electron accepting" will encompass the term "hole donating."

What is claimed is:
1. A current conducting device comprising:
   (1) a body of conjugated polyolefinic organic material, said body having spaced first and second surfaces;
   (2) first electrode means in conductive contact with said first surface for donating electrons to said organic material, the energy requirement of said first electrode means for donating an electron being less than the energy released by said organic material in accepting an electron;
   (3) second electrode means comprising an electrolyte in physical and conductive contact with said second surface for accepting electrons from said organic material, the energy requirement of said organic material for donating an electron being greater than the energy released by said second electrode means in accepting an electron; and
   (4) first and second terminal means in conductive contact with said first and second electrode means, respectively;
whereby upon application to said second surface of energy of a magnitude at least equal to the difference between the energy requirement of said organic material for donating an electron and the energy released by said second electrode means in accepting an electron, the conductivity of the device between said first and second terminal means is substantially increased.

2. The device of claim 1 wherein said first electrode means comprises an electrolyte.

3. The device of claim 1 wherein said second electrode means comprises an electrolyte having an undissociated molecular solute therein for supplying additional positive and negative ions.

4. The device of claim 1 wherein said second electrode means comprises an electrolyte having an undissociated molecular solute of picric acid therein.

5. The device of claim 1 wherein said organic material is monocrystalline.

6. The device of claim 1 wherein said organic material is an anthracene crystal.

7. The device of claim 1 wherein said terminal means are connected across a voltage source.

8. The device of claim 1 wherein said terminal means are connected across a unidirectional voltage source.

9. A current conducting device comprising:
   (1) a body of conjugated polyolefinic organic material, said body having spaced first and second surfaces;
   (2) first electrode means in conductive contact with said first surfaces for donating electrons to said organic material, the energy requirement of said first electrode means for donating an electron being less than the energy released by said organic material in accepting an electron;
   (3) second electrode means comprising an electrolyte in physical and conductive contact with said second surface for accepting electrons from said organic material, the energy requirement of said organic material for donating an electron being less than the energy released by said second electrode means in accepting an electron; and (4) first and second terminal means in conductive contact with said first and second electrode means, respectively;

whereby upon application to said second electrode means of electromagnetic energy the magnitude of the energy released by said second electrode means in accepting an electron is substantially increased, thereby substantially increasing the conductivity of the device between said first and second terminal means.

10. The device of claim 9 wherein said second electrode means comprises an electrolyte having an undissociated molecular solute of iodine therein.

11. The device of claim 9 wherein said first electrode means and said organic material are substantially transmissive of electromagnetic energy of a selected wavelength, whereby electromagnetic energy of said wavelength may be injected into said second electrode means through said first electrode means and said organic material to substantially increase the magnitude of the energy released by said second electrode means in accepting an electron, thereby substantially increasing the conductivity of the device between said first and second terminal means.

12. A current conducting device comprising:
(1) a monocrystalline body of organic material, said body having spaced first and second surfaces;
(2) first and second electrolytes in contact with said first and second surfaces respectively;
(3) each of said electrolytes having both positive and negative ions, all components in the positive ions of one of said electrolytes having a work function greater than the work function of said organic material;
(4) means for applying electromagnetic energy from an external source to said organic material of a magnitude at least equal to the difference in the work function of said organic material and the work function of one of said components; and
(5) terminal means in contact with each of said electrolytes for making electrical connections thereto.

13. The device of claim 12 wherein at least one of said electrolytes contains undissociated molecules comprising means for supplying additional positive and negative ions.

References Cited by the Examiner

UNITED STATES PATENTS

| 2,870,344 | 1/1959 | Brattain et al. | 317—233 |
| 2,896,095 | 7/1959 | Reed et al. | 317—231 X |

OTHER REFERENCES

Semiconductor Abstracts, vol. VI–1958 issue; J. J. Bulloff, C. S. Put, Editors, copy in Div. 64 cited: Paragraph 1284 which is an abstract of "Conducting States in Molecular Crystals," by D. Fox, and paragraph 1086 which is an abstract of "Electronic Properties of Aromatic Hydrocarbons. IV Photoelectric Effects," by D. C. Northrup and O. Simpson.

JOHN W. HUCKERT, *Primary Examiner.*

JAMES D. KALLAM, *Examiner.*